US010577123B1

(12) United States Patent
Kirtz et al.

(10) Patent No.: US 10,577,123 B1
(45) Date of Patent: Mar. 3, 2020

(54) PRECAUTION SYSTEM FOR TERRAIN AVOIDANCE WARNING SYSTEM (TAWS) EQUIPPED AIRCRAFT

(71) Applicant: Rockwell Collins, Inc., Cedar Rapids, IA (US)

(72) Inventors: Jon E. Kirtz, Center Point, IA (US); Travis S. VanDerKamp, Marion, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 174 days.

(21) Appl. No.: 15/624,406

(22) Filed: Jun. 15, 2017

(51) Int. Cl.
- B64D 45/04 (2006.01)
- G08G 5/00 (2006.01)
- G08G 5/04 (2006.01)

(52) U.S. Cl.
CPC ........... *B64D 45/04* (2013.01); *G08G 5/0086* (2013.01); *G08G 5/045* (2013.01)

(58) Field of Classification Search
None
See application file for complete search history.

(56) References Cited

U.S. PATENT DOCUMENTS

| | | | |
|---|---|---|---|
| 6,452,511 B1 * | 9/2002 | Kelly | G01C 5/005 340/961 |
| 7,057,549 B2 * | 6/2006 | Block | G01C 5/005 342/120 |
| 8,160,757 B1 * | 4/2012 | Frank | G01C 23/00 701/11 |
| 2006/0253231 A1 * | 11/2006 | Khatwa | G01C 5/005 701/9 |
| 2010/0004801 A1 * | 1/2010 | Flotte | G05D 1/0646 701/8 |
| 2010/0070176 A1 * | 3/2010 | Feyereisen | G01C 23/005 701/448 |
| 2010/0125381 A1 * | 5/2010 | Botargues | G01C 5/005 701/9 |

OTHER PUBLICATIONS

"Terrain Awareness and Warning System", Robert McShea, Test and Evaluation of Aircraft Avionics and Weapons Systems, Institution of Engineering and Technology, 2015, p. 382-389 (Year: 2015).*
"Fundamentals of Terrain Avoidance Warning", Cary Spitzer et al., Digital Avionics Handbook, Taylor & Francis, 2016, p. 21-2 to 21-10 (Year: 2016).*

* cited by examiner

*Primary Examiner* — Tamara L Weber
(74) *Attorney, Agent, or Firm* — Donna P. Suchy; Daniel M. Barbieri (57) ABSTRACT

Systems and methods provide a precaution in an aircraft equipped with a terrain avoidance warning system (TAWS). The precaution is provided before a caution and a warning are issued by the TAWS for a subsequent condition to a precaution condition. The systems and methods determine an existence of the precaution condition at least partially in response to an altitude signal and provide a line on a display indicative of a threshold altitude in response to the precaution condition or a bar on an altitude tape of a primary flight display. The line is between a representation of the aircraft and a representation of terrain. The threshold altitude is an altitude at which a caution is issued by the TAWS.

20 Claims, 6 Drawing Sheets

PRECAUTION SYSTEM FOR TERRAIN AVOIDANCE WARNING SYSTEM (TAWS) EQUIPPED AIRCRAFT

BACKGROUND

Embodiments of inventive concepts disclosed herein relate generally to the field of terrain awareness for aircraft. More particularly, embodiments of the inventive concepts disclosed herein relate to systems and methods that display data or provide audible messages related to cautions and/or warning alerts.

Aircraft pilots rely on situational awareness systems, such as, terrain awareness and warning systems (TAWSs), ground proximity warning systems (GPWSs), weather radar systems, and/or a traffic collision and avoidance system (TCAS), to avoid collisions with hazards, such as terrain, man-made structures, weather, and other aircraft. A TAWS may analyze aircraft sensor data and/or other data to predict whether the path of the aircraft is likely to intersect with hazards, such as terrain and/or man-made structures. For instance, such systems may compare an altitude of the aircraft to elevation of terrain near the aircraft and provide an indication of terrain that has a high enough elevation to be of potential concern to the pilot. The TAWS can provide the aircraft pilot and/or other flight crew members with advance audio and/or visual caution and warning alerts of impending terrain or structural hazards, as well as forward looking capability. A TAWS complying with Technical Standard Order TSO-C151c depicts terrain relative to an aircraft's position such that the pilot is able to estimate the relative bearing to the terrain of interest.

Nuisance alerts are alerts issued by equipment that are not desired. Nuisance alerts from equipment, such as, a TAWS, can be alerts that are improperly issued, are premature, have little relevance to the existing flight path, are less critical than other alerts, or are unnecessary because the pilot is already aware of situation causing the alert. For example, a pilot may fly low enough to terrain and trigger an alert, but may consider the alert a nuisance alert because she or he has complete situational awareness. The TAWS algorithms are objective and based on accurate state-of-the-art sensors, but do not consider the pilot's situational awareness. Nuisance alerts can distract a pilot from other critical tasks, cause a pilot to completely ignore the TAWS alerts, or turn the equipment off.

Conventional TAWS have attempted to decrease the number of nuisance alerts by reducing alerting tolerances and margins or even applying deviations from the required alerting envelopes. This approach has driven many of the caution alerts to simply be preambles to their corresponding warning alerts. With this type of approach, the caution alerts require the same response as warning alerts, especially since some TAWS alerting modes only provide a caution alert, or may be issued too late. In addition, with reduced tolerances and margins, the time required to orally issue a caution alert (e.g., 2 seconds) can be longer than the time between the caution alert and the warning alert if the aircraft continues along the same flight path.

SUMMARY

In one aspect, the inventive concepts disclosed herein are directed to a method of providing a precaution in an aircraft equipped with a terrain avoidance warning system (TAWS). The precaution is provided before a caution and a warning are issued by the TAWS for a subsequent condition to a precaution condition. The method includes receiving an altitude signal associated with the aircraft, determining an existence of the precaution condition at least partially in response to the altitude signal, and providing an indicator on a vertical situational display indicative of a threshold altitude in response to the precaution condition. The threshold altitude is an altitude at which a caution is issued by the TAWS.

In a further aspect, the inventive concepts disclosed herein are directed to a method of providing a precaution in an aircraft equipped with a TAWS. The precaution is provided before a caution and a warning is issued by the TAWS for a precaution condition. The method includes receiving an altitude signal associated with the aircraft, determining an existence of the precaution condition at least partially in response to the altitude signal, and providing a colored bar on an altitude tape of a primary flight display (PFD) in response to the precaution condition. The colored bar is at a location of a threshold altitude on the altitude tape, and the threshold altitude is an altitude at which a caution is issued by the TAWS.

In a further aspect, the inventive concepts disclosed herein are directed to a method of providing a precaution in an aircraft equipped with a TAWS. The precaution is provided before a caution and a warning are issued by the TAWS for a subsequent condition to a precaution condition. The method includes receiving an altitude signal associated with the aircraft, determining an existence of the precaution condition at least partially in response to the altitude signal, and providing a line on a topographical display indicative of a threshold altitude in response to the precaution condition. The line is between a representation of the aircraft and a representation of terrain in a perspective view, and the threshold altitude is an altitude at which a caution is issued by the TAWS.

In some aspects, embodiments of the inventive concepts disclosed herein are directed systems and methods that provide a precaution in an aircraft equipped with a TAWS. The precaution is provided before a caution and a warning are issued by the TAWS for a subsequent condition to a precaution condition. The systems and methods determine an existence of the precaution condition at least partially in response to altitude and provide a line on a display indicative of a threshold altitude in response to the precaution condition or a bar on an altitude tape of a PFD. The line is between a representation of the aircraft and a representation of terrain. The threshold altitude is an altitude at which a caution is issued by the TAWS.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, systems and methods that may be used to provide display data, including precaution alerts of potentially dangerous terrain, to electronic displays of an aircraft are described with respect to various aspects of inventive concepts. The precaution alerts can be provided for various alerting modes including but not limited to: altitude cautions and warnings, excessive descent rate cautions and warnings, GPWS cautions and warnings (e.g., modes 1-5), FLTA cautions and warnings, forward looking object avoidance (FLOA) cautions and warnings, and premature descent alert (PDA) cautions and warnings. The systems and methods provide situational awareness relative to the sense of urgency allowing for a range of visual, aural, and graphical annunciation from subtle to dramatic, with the precaution alert being the subtle indication in some embodiments.

The systems and methods advantageously provide multiple precaution alerts (aural, visual, and graphical) that provide a subtle initial indication that situational awareness needs attention depending on the specific alerting mode in some embodiments. When the subtle indication does not gain the attention of the crew, or the crew chooses not to address the situation and continues on the same flight path, the caution and/or warning alert is provided by the TAWS according to TAWS functionality. The systems and methods reduce the issuance of nuisance alerts by providing subtle advanced indications of the upcoming cautions and warning alerts so the crew can avoid the alert in some embodiments.

It should be noted that the term aircraft, as utilized herein, may include any manned or unmanned object or vehicle capable of flight. Examples of aircraft may include, but are not limited to, fixed-wing aerial vehicles (e.g., propeller-powered or jet-powered), rotary-wing aerial vehicles (e.g., helicopters), manned aircraft, unmanned aircraft (e.g., unmanned aerial vehicles, or UAVs), and delivery drones. The term TAWS, as utilized herein, refers to any type of terrain or threat avoidance system including a GPWS, enhanced GPWS, TAWS, combinations thereof, or other flight path warning system under standard using any type of alerting modes or not under a standard.

For the purposes of the present disclosure, the terrain includes any type of object, obstacle or locations of interest that could present a risk of collision to an aircraft. Examples of locations of interest include, but are not limited to, ground, hills, mountains, trees, rock formations, buildings, utility/transmission towers, other aircraft, etc. Locations of interest may be naturally occurring or man-made.

Figure 1:
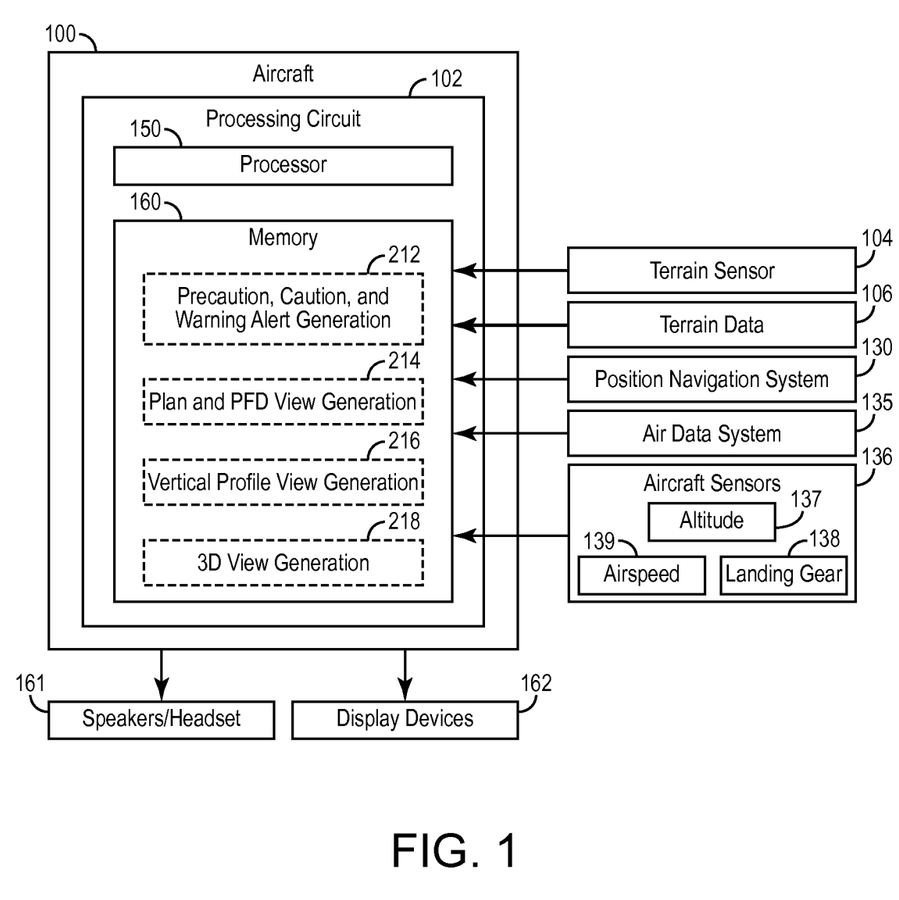
FIG. 1 is a block diagram of a TAWS configured to generate terrain precaution alerts for an aircraft according to exemplary aspects of the inventive concepts disclosed herein.

Referring now to FIG. 1, a block diagram of an aircraft 100 includes a processing circuit 102 for generating alert data formatted for display as alerts in accordance with TAWS functionality in some embodiments. The aircraft 100 is any air-based platform, such as a manned or unmanned fixed-wing or rotary-wing aircraft.

The processing circuit 102 is configured to collect data regarding one or more terrain features proximate to the aircraft 100 that may pose a risk to the aircraft 100 and data related to the performance of the aircraft 100 (e.g., location, vertical speed, altitude, phase of flight, velocity) and determine a precaution, caution or warning condition. The processing circuit 102 causes an appropriate precaution, caution, or warning alert to be provided to the pilot or crew in response to the precaution, caution or warning condition. The data related to the terrain features can be directly sensed by a terrain sensor 104 or be provided by a terrain database 106.

In some embodiments, the processing circuit 102 communicates with a position/navigation system 130, such as an onboard Embedded Global Positioning System/Inertial Navigation System (EGI), an inertial reference system (IRS), or other positioning device. In some embodiments, the processing circuit 102 communicates with an air data system 135 (e.g., an air data computer or flight management computer (FMC)) that can collect, derive, and accumulate data regarding phase of flight, wind, air speed, turbulence, vertical speed, altitude, attitude, heading, velocity, acceleration, and/or other air-related data. The air data system 135 is coupled with or in communication with the position/navigation system 130 and aircraft sensors 136 such as an altimeter 137 (e.g., a radar altimeter and barometric altimeter), landing gear sensors 138, airspeed sensors 139, etc. The air data system 135 can refine data received from the aircraft sensors 136 for processing by the processing circuit 102 and for use in providing TAWS precaution, caution, and warning alerts. The processing circuit 102 may include one or more wireless or wired communication interfaces configured to enable communication with other devices/platforms.

In some embodiments, the processing circuit 102 is configured to generate display data in a format that can be interpreted by one or more display devices 162 to generate display screens. The display devices 162 can be head down displays (HDDs), head up displays (HUDs), worn displays, helmet mounted displays, and any associated computers and display electronics. The display devices 162 can be located onboard the aircraft 100 or at a control counsel for remotely controlling the aircraft 100. The display screens provided on the display devices 162 can include a PFD, vertical situational display (VSD), horizontal situational display, a HUD display, an enhanced visions display, a synthetic vision display, a weather radar display, a plan view display, a topographical display, a synthetic vision display, an enhanced vision display, etc. The processing circuit 102 can provide verbal or auditory warnings via a head set or speakers 164.

The processing circuit 102 includes at least one processor 150, which may be any type of general purpose or special purpose processor (e.g., FPGA, CPLD, ASIC). The processing circuit 102 also includes at least one memory 160, which may be any type of non-transitory computer or machine-readable storage medium (e.g., ROM, RAM, hard disk, flash memory).

The memory 160 includes one or more modules or routines including instructions that may be executed by the processor 150 to perform various processing functions for the aircraft 100. For example, the memory 160 includes a precaution, caution and warning alert generation module 212 configured to generate alert data for displaying alerts within one or more types of terrain display screens on one or more display devices 162 (e.g., cathode ray tubes (CRTs), liquid crystal display (LCDs), light emitting diode (LED)-based). In some embodiments, the caution and warning alerts can be provided according to TAWS functionality. The TAWS functionality for caution and warning alerts can be provided by commercially available or off-the-shelf TAWS and software. The precaution, caution and warning alert generation module 212 receives terrain data from the terrain database 106 or the terrain sensor 104, position data from the position/navigation system 130, and flight data from the air data system 135 to generate the precautions caution, and warning alerts. In some embodiments, the precaution, caution and warning alert generation module 212 may be integrated with or otherwise be a part of aircraft equipment.

In some embodiments, the precaution, caution and warning alert generation module 212 is configured to detect precaution, caution and warning conditions by comparing elevation data for terrain near the aircraft with an alert threshold and provide precaution, caution, warning alerts audibly or on the display devices 162. The precaution condition is a condition subsequent to a caution condition associated with TAWS functionality, such a precaution condition for a forward looking terrain avoidance alert (FLTA), for a premature descent into terrain (PDA) alert, for a mode 1 excessive descent rate alert terrain alert, for a mode 2 excessive terrain closure rate, a mode 3 altitude loss after takeoff or go-around alert, for a mode 4 unsafe terrain clearance when not in landing configuration alert, for a mode 5 excessive deviation from ILS glide slope alert, or for a mode 6 descent below the selected minimum radio altitude alert in some embodiments. The alert threshold for precaution alerts is generally larger than the alert threshold for caution alerts which is larger than the alert threshold for warning alerts. For example, alert thresholds can be based upon an amount of vertical speed (e.g., descent), a delta height to terrain, a deviation from approach angle, a distance to runway and vertical speed, combinations thereof, etc. Generally, if the aircraft 100 flies along the same flight path, the precaution condition is detected before the caution condition which is detected before the warning condition. The precaution, caution and warning alert generation module 212 is configured to provide the precaution, caution and warning alert in response to the respective detection of the precaution, caution and warning conditions.

Envelopes sized for cautions, warnings, and alerts based upon at least one of air speed, phase of flight, vertical speed, terrain height, distance to the runway, or heading can be used to detect the precaution, caution and warning conditions. The envelope for precaution alerts is generally larger than the envelope for caution alerts which is larger than the envelope for warning alert. In some embodiments, a FLTA envelope may be utilized in accordance with TSO-C 151 (e.g., TSO-C C151c) to provide the precaution, caution, and warning alert based upon the respective precaution, caution and warning conditions.

The precaution, caution, and warning alert generation module 212 can determine the precaution condition in accordance with standard TAWS cautions by using increased caution thresholds (e.g., thresholds that are more likely to result in an alert than are used for the caution alert). For example, if the a delta height threshold between the terrain and aircraft altitude is 500 feet for a TAWS caution condition, the delta height threshold can be 1000 feet for the precaution condition. Other thresholds or factors can be adjusted and may relate to airspeed, vertical airspeed, estimated time until impact, and other flight parameters. In some embodiments, the processing circuit 102 does not issue precaution alerts for conditions that are well into the future. For example, the processing circuit 102 does not issue precaution alerts for precaution conditions that are more than 2 minutes away or at a range of more than 100 nautical miles. The processing circuit 102 can filter out precaution conditions that are not more immediate in some embodiments.

In some embodiments, the alert generation module 212 may be configured to calculate a threshold altitude associated with a TAWS caution and cause the threshold altitude to be displayed in response to the detection of a precaution condition as part of or as the entire precaution alert. The threshold altitude is determined by determining at what altitude the caution condition would be detected with current flight parameters or on the current flight path. In some embodiments, the threshold elevation is calculated as an absolute elevation value. In some embodiments, the threshold elevation is calculated based on the current altitude of the aircraft 100 or the projected elevation of an aircraft based on the aircraft's flight trajectory. For example, if a caution alert would issue if the aircraft's altitude decreased by 1000 ft., then the the threshold altitude would be 1000 feet below the aircraft 100.

The threshold altitude is displayed to the display devices 162 and can be annunciated on the speakers 164 to provide the precaution. The threshold altitude can be displayed as a line on a vertical situational display, a bar on an altitude tape of a PFD, or as a line on a topographic display in some embodiments. The threshold altitude can also be displayed textually. In some embodiments, the thresholds altitude continues to be identified after the caution alert is issued so that the crew is aware at what altitude the caution will be removed. In some embodiments, the precaution alert and/or the indication of the threshold altitude is removed when the caution alert or warning alert is issued.

In some embodiments, a threshold altitude for a warning condition can be determined. The threshold altitude for a warning condition is determined by determining at what altitude the a warning condition would be detected with current flight parameters or on the current flight path. For example, if a warning alert would be provided if the altitude were 2000 ft. below the present altitude on the current flight path or under current flight conditions, the warning threshold altitude is set at 2000 feet below the aircraft 100. The warning altitude threshold can be displayed as part of the precaution alert in some embodiments.

In some embodiments, the memory 210 may include one or more modules configured to generate display data formatted for display on one or more of the display devices 162 as one or more types of terrain display screens. For instance, a plan view and PFD generation module 214 may be configured to generate a plan view display screen and/or a PFD display screen representing the terrain near the aircraft 100. In some embodiments, a vertical profile view generation module 216 may generate a vertical profile view (e.g., a VSD) display screen representing terrain near (e.g., in front of) the aircraft 100 within a particular vertical slice (e.g., a vertical slice selected by the pilot within the plan view display screen). In some embodiments, a three-dimensional (3D) view generation module 218 may generate a 3D view (e.g., a topographical) display screen representing terrain near the aircraft 100 within three dimensions. In other embodiments, various other types of views may be generated for display on display device(s) 245. Plan view and PFD generation module 214, vertical profile view generation module 216, and/or 3D or perspective or 3D view generation module 218 may include one or more alerts, including alerts showing indicator lines, within the generated display data based on alert data generated by alert generation module 212. The alerts include the precaution alert, the caution alert, and the warning alert provided by the precaution, caution and warning alert generation module 212.

In some embodiments, the precaution alert includes visual indications in the form of lines, text, graphics, or other indications of the bearing, distance, and time to the alert area. For instance, a line indicator, a countdown timer, and/or a distance indicator may be graphically displayed with an alert. In some embodiments, the alert generation module provides a precaution using audio, (e.g. a voice stating "TERRAIN AWARENESS"). The audio annunciation allows the crew to focus on the aircraft's situation and position. Although the audio precaution does not provide detailed information about the precaution condition, it serves to bring the precaution condition to the pilot's attention. In some embodiments, a visual precaution alert is provided as a visual flag (such as the text "AWARE" on a display screen similar to the visual annunciations for caution alerts such as "GND PROX" and warning alerts such as "PULL UP"). The precaution alert as a visual flag can be located in the middle of the PFD or in a more subtle location such as a non-middle portion of a display screen. In some embodiments, precaution alerts as visual annunciations include engine-indicating and crew-alerting system (EICAS) messages, highlighting data (e.g. altitude and vertical speed) on the PFD, or even additional visual flags (e.g. Terrain Closure Rate). In some embodiments, the visual flag is an indicator providing the aircraft's overall position with respect to terrain and indicates one of the following: 'OK', 'IMPROVE', 'STABLE', or 'WORSE'.

In some embodiments, the terrain sensor 104 may be or includes a radar (e.g., millimeter-wave, or MMW, radar system), or an optical sensor (e.g., a light detection and ranging (LIDAR) system). In some embodiments, the terrain sensor 104 may be or communicates with a weather radar system configured to detect features of terrain around the aircraft.

The elevation data may be generated by the processing circuit 102, and may be stored within the terrain database 106. In some embodiments, the terrain database 106 may be stored within the memory 210. In some embodiments, the elevation data may also include pre-generated elevation data stored within the terrain database 106 and/or within a separate topographic database. The elevation data may be represented using any sort of data structure (e.g., lookup table, linked list) capable of correlating positions elevations, such that an elevation at a particular position can be determined from the elevation data.

Figure 2:
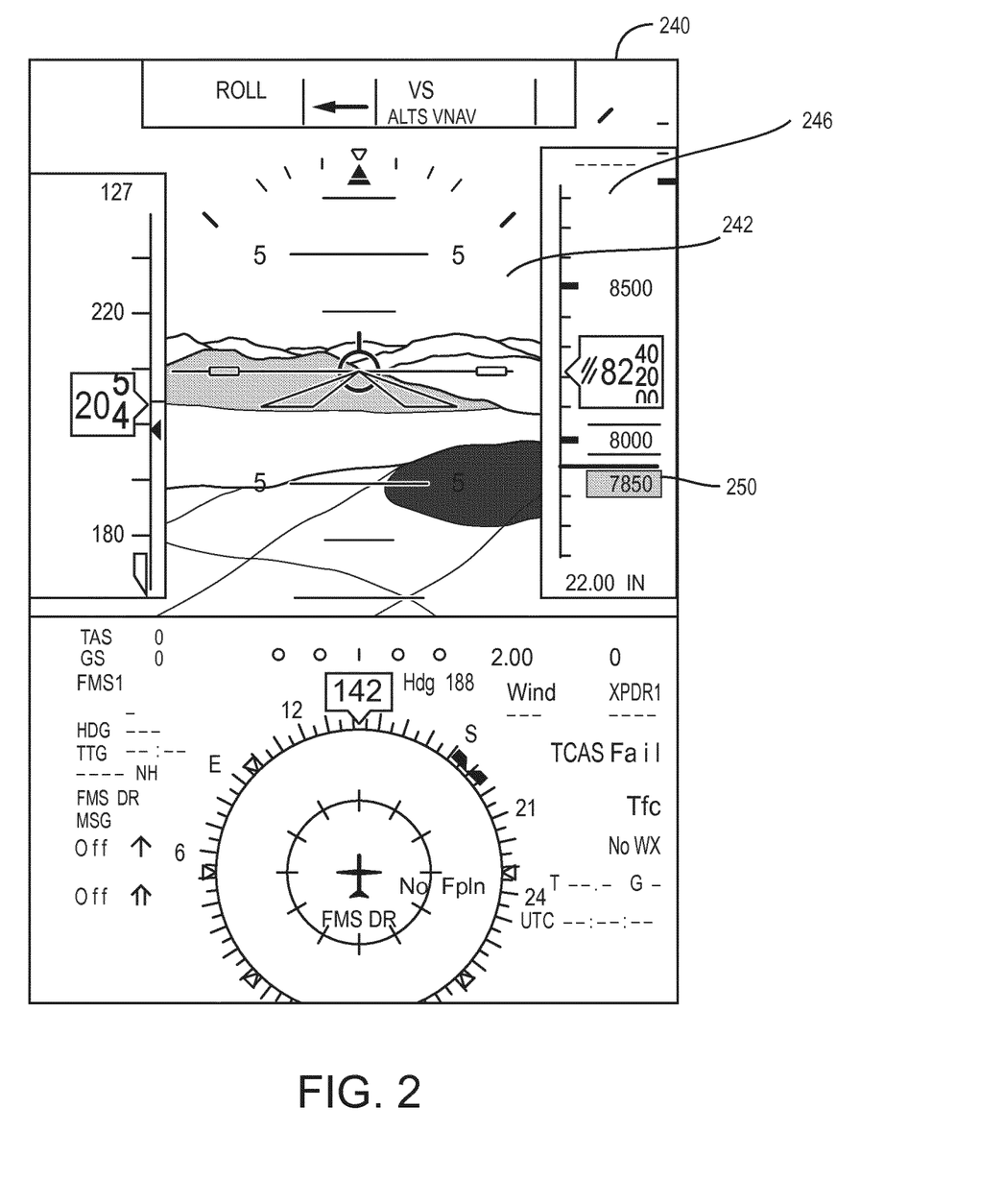
FIG. 2 is a plan view illustration of a PFD display screen showing an altitude precaution alert for the TAWS illustrated in FIG. 1 according to exemplary aspects of the inventive concepts disclosed herein.

With reference to FIG. 2, a PFD display screen 240 includes a perspective view synthetic vision image 242 and an altitude tape 246. A bar 250 on the altitude tape 246 is a precaution alert and can be colored yellow. The bar 250 highlights a threshold altitude (e.g., 7850) which is an altitude at which a caution will be issued. Although not shown in FIG. 2, the number 7850 can be read through the bar 250 on the tape 246 in some embodiments. The provision of the precaution alert on the altitude tape 246 provides a subtle indication that does not distract the pilot and yet draws attention to the caution alert threshold at 7850 feet. In some embodiments, a textual altitude threshold (e.g., altitude at which a caution condition exists) for the precaution alert can also be displayed on the altitude tape 246. The synthetic vision image 242 can also include colored regions indicating altitude thresholds for TAWS warning alerts. If the altitude falls to 7850 ft. and other relevant conditions remain the same, a caution alert is issued by the processing circuit 102. The PFD display screen 240 can be provided on HDDS or HUDS.

Figure 3:
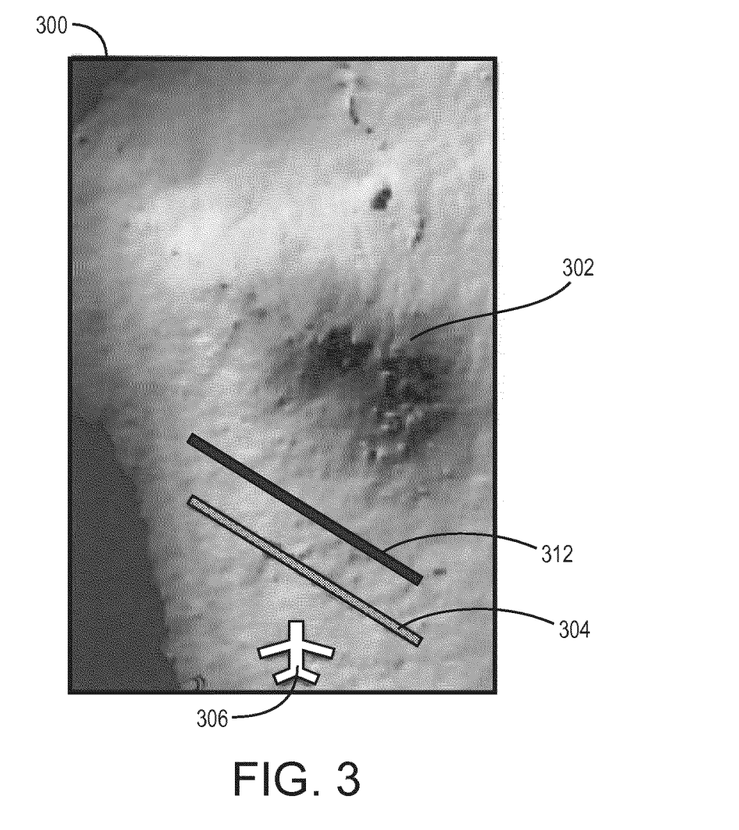
FIG. 3 is a plan view illustration of a topographical display screen showing a precaution alert for a forward looking terrain alert (FLTA) for the TAWS illustrated in FIG. 1 according to exemplary aspects of the inventive concepts disclosed herein.

With reference to FIG. 3, a topographical display screen 300 includes a topographical perspective view synthetic image 302. A yellow line 304 between terrain in the image 302 and a representation 306 of the aircraft 100 is a precaution alert. The line 304 represents a threshold altitude drawn conformally with the perspective view. The provision of the precaution alert as the yellow line 304 provides a subtle indication that does not distract the pilot and yet draws attention to the caution alert threshold. In addition, the yellow line does not cover other features in the synthetic vision image 302 significantly. In some embodiments, an altitude threshold for a warning alert is provided as a red line 312. The synthetic vision image 302 can also include colored regions indicating altitude thresholds for TAWS caution and warning alerts. The topographical display screen 300 can be provided on HDDS or HUDS. The precaution shown in FIG. 3 is for an FLTA and the yellow line 304 and the red line 312 indicate at what altitude the caution and warning alerts, respectively, would take place given the current trajectory.

Figure 4:
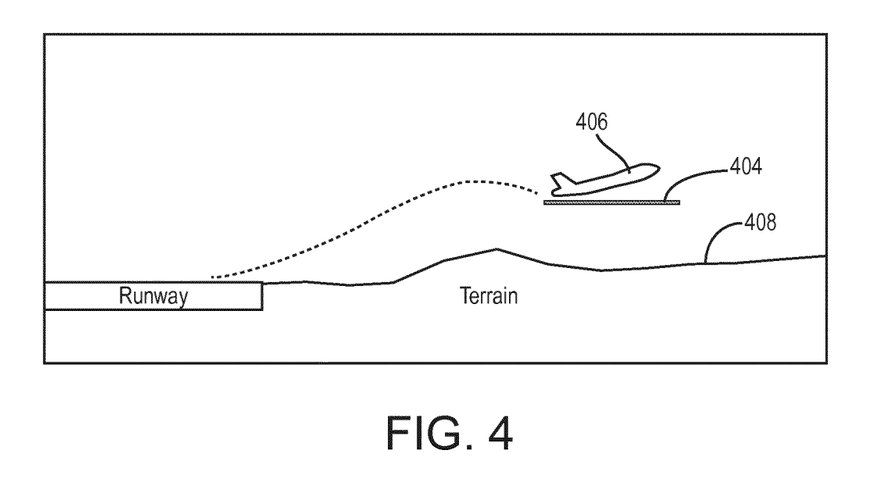
FIG. 4 is a plan view illustration of a vertical situational display (VSD) display screen showing a precaution alert for an altitude loss after takeoff alert for the TAWS illustrated in FIG. 1 according to exemplary aspects of the inventive concepts disclosed herein.

With reference to FIG. 4, a VSD display screen 400 provides a side view of the flight path with respect to terrain 408. A yellow line 404 between the terrain 408 and a representation 406 of the aircraft 100 is a precaution alert. The yellow line 404 represents a precaution alert for an altitude loss after takeoff alert. If the aircraft begins to lose altitude, the yellow line 404 is provided on the VSD display screen 400 to indicate how low the aircraft 100 would need to sink in order to receive a TAWS caution alert (e.g., the threshold altitude for an altitude loss after takeoff alert caution condition).

Figure 5:
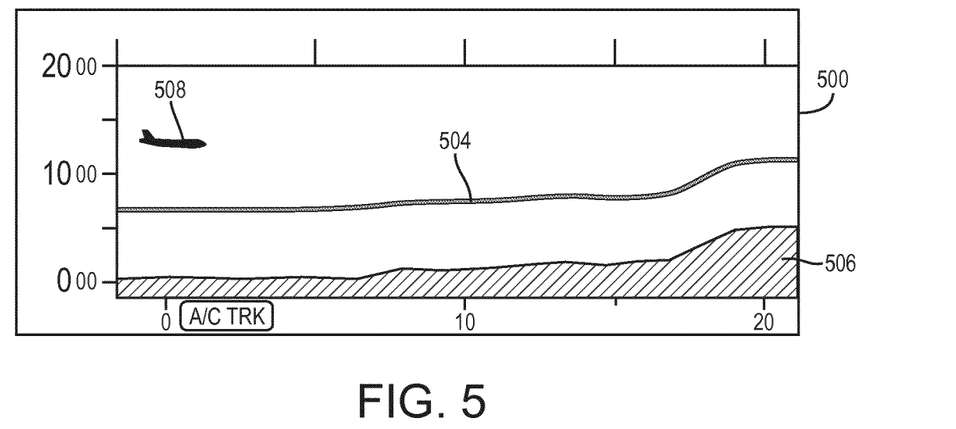
FIG. 5 is a plan view illustration of a VSD display screen showing an FLTA precaution alert for the TAWS illustrated in FIG. 1 according to exemplary aspects of the inventive concepts disclosed herein.

With reference to FIG. 5, a VSD display screen 500 provides a side view of the flight path with respect to terrain 506. A yellow line 504 between the terrain 506 and a representation 508 of the aircraft 100 is a precaution alert. The yellow line 504 represents an altitude at which a caution alert for an FLTA based upon distance to runway and vertical speed (e.g., altitude, distance to runway, terrain height, and vertical speed) would be issued. The yellow line 504 is provided continually along future locations with respect to the flight path of the aircraft 100. The threshold altitude is calculated as a height above the terrain 506 at locations along the flight path in some embodiments. In some embodiments, the line 504 is only shown when the aircraft 100 descends below a particular altitude (e.g., 7500 ft. above ground level (AGL)).

Figure 6:
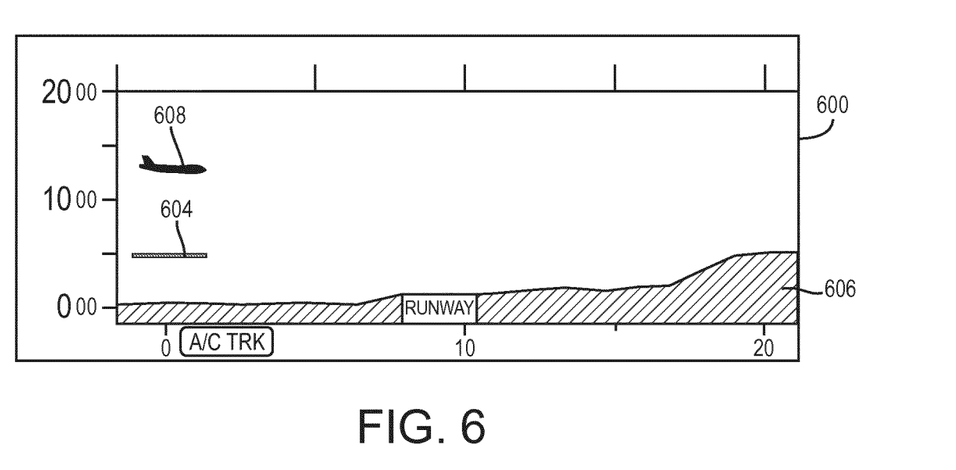
FIG. 6 is a plan view illustration of a VSD display screen showing a premature descent alert (PDA) precaution alert for the TAWS illustrated in FIG. 1 according to exemplary aspects of the inventive concepts disclosed herein.

With reference to FIG. 6, a VSD display screen 600 provides a side view of the flight path with respect to terrain 606. A yellow line 604 between the terrain 606 and a representation 608 of the aircraft 100 represents a precaution alert for a PDA based upon a fixed envelope in relation to the runway. The yellow line 604 represents the threshold altitude for a PDA TAWS caution alert.

Figure 7:
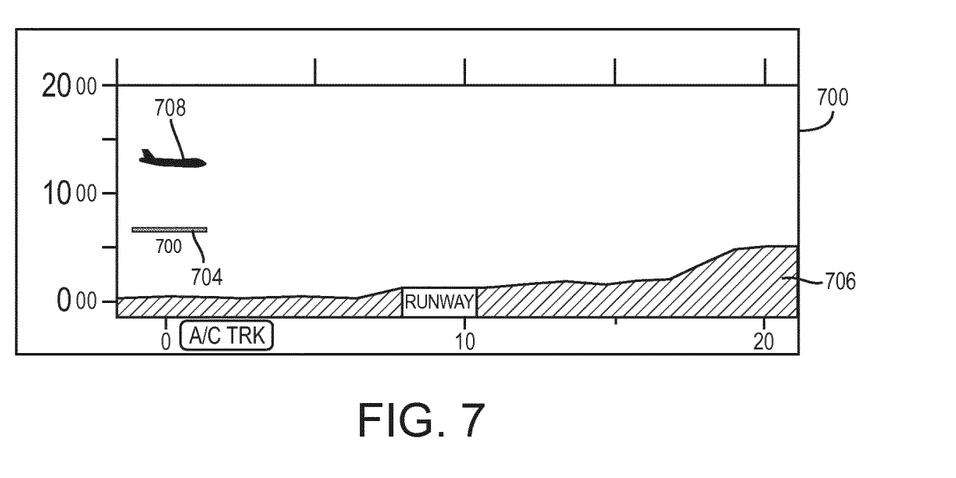
FIG. 7 is a plan view illustration of a VSD display screen showing a PDA precaution textual alert for the TAWS illustrated in FIG. 1 according to exemplary aspects of the inventive concepts disclosed herein.

With reference to FIG. 7, a VSD display screen 700 provides a side view of the flight path with respect to terrain 706. A yellow line 704 between the terrain 706 and a representation 708 of the aircraft 100 is a precaution alert. The yellow line 704 represents a precaution alert for a PDA based upon a fixed envelope in relation to the runway. Beneath the yellow line 704, text of the altitude threshold can be provided.

Figure 8:
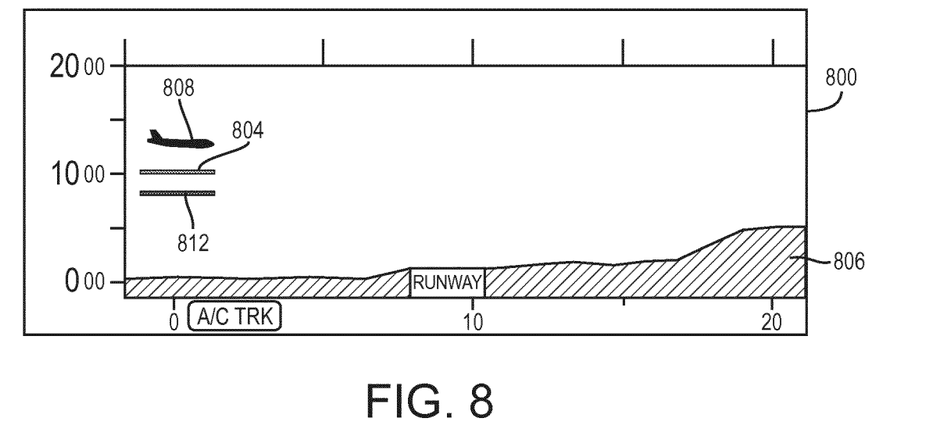
FIG. 8 is a plan view illustration of a VSD display screen showing an excessive vertical speed precaution alert for the TAWS illustrated in FIG. 1 according to exemplary aspects of the inventive concepts disclosed herein.

With reference to FIG. 8, a VSD display screen 800 provides a side view of the flight path with respect to terrain 806. A yellow line 804 between the terrain 806 and a representation 808 of the aircraft 100 represents a precaution alert based on vertical speed (e.g., excessive descent rate) (e.g., mode 1 alert). If the aircraft 100 has a vertical speed that is above a threshold for a precaution condition, the yellow line 804 is provided on the VSD display screen 800 to indicate how low the aircraft 100 would need to sink in order to receive a TAWS caution alert (e.g., for excessive descent rate). In addition, a redline 812 can be provided to indicate at what altitude a TAWS warning alert would be issued. Textual altitude readings can also be provided.

Figure 9:
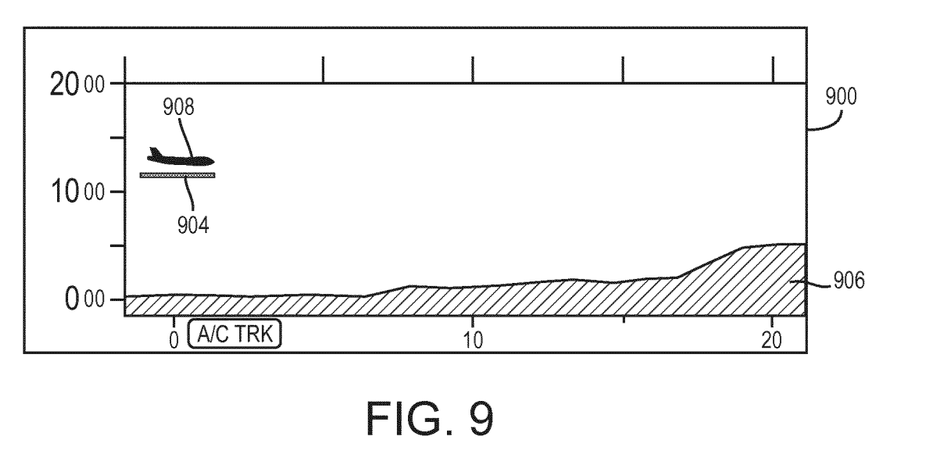
FIG. 9 is a plan view illustration of a VSD display screen showing height above terrain precaution alert for the TAWS illustrated in FIG. 1 according to exemplary aspects of the inventive concepts disclosed herein.

With reference to FIG. 9, a VSD display screen 900 provides a side view of the flight path with respect to terrain 906. A yellow line 904 between the terrain 906 and a representation 908 of the aircraft 100 is a precaution alert. The yellow line 904 represents a precaution alert for a height above terrain alert (e.g., mode 3 alert) and indicates how low the aircraft 100 would need to sink in order to receive a height above terrain caution alert.

Figure 10:
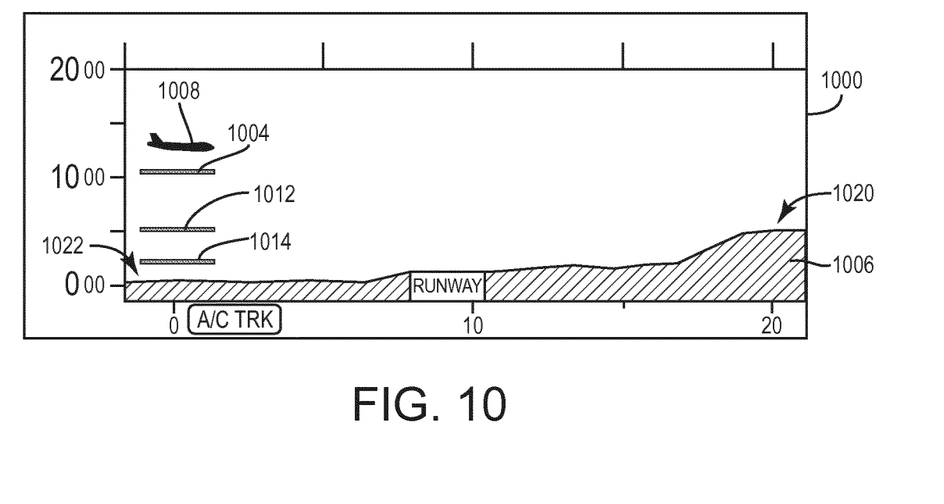
FIG. 10 is a plan view illustration of a VSD display screen showing an unsafe terrain clearance when not in landing configuration precaution alert for the TAWS illustrated in FIG. 1 according to exemplary aspects of the inventive concepts disclosed herein.

With reference to FIG. 10, a VSD display screen 1000 provides a side view of the flight path with respect to terrain 1006. A yellow line 1004 between the terrain 1006 and a representation 1008 of the aircraft 100 is a precaution alert. The yellow line 1004 represents a precaution alert for a height above terrain (e.g., mode 4 alert) where the height is calculated as a fixed value above the terrain. Additional yellow lines 1012 and 1014 can be provided to indicate threshold altitude at various locations. For example, the yellow line 1014 may be an indication of the threshold altitude for a TAWS caution alert at location 1022 while the yellow line 1004 is a threshold altitude for a caution alert for the terrain at location 1020 (e.g., in front of the aircraft 100). In some embodiments, the only one of the lines 1004, 1012, and 1014 is shown at a time even if all the lines 1004, 1012, and 1014 are applicable. The shown line can be the line closest to the aircraft 100 (e.g., the line 1004). The shown line can be shown until the alerting condition is addressed (e.g., ground speed reduced). For example, a yellow line 1104 (FIG. 11) is shown next for aircraft below glide scope until addressed and then other caution lines can be shown based upon conditions.

Figure 11:
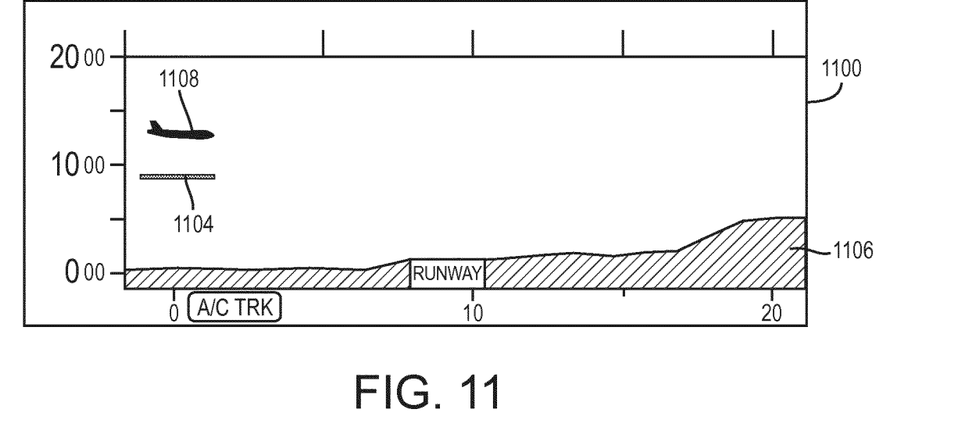
FIG. 11 is a plan view illustration of a VSD display screen showing a precaution alert based upon fixed approach angle for the TAWS illustrated in FIG. 1 according to exemplary aspects of the inventive concepts disclosed herein.

With reference to FIG. 11, a VSD display screen 1100 provides a side view of the flight path with respect to terrain 1106. The yellow line 1104 between the terrain 1106 and a representation 1108 of the aircraft 100 is a precaution alert. The yellow line 1104 represents a precaution alert for a fixed approach angle. The fixed approach angle alert can be a mode 5 alert. The yellow line 1104 represents a threshold altitude at which a TAWS caution alert would be provided for the fixed approach angle alert condition.

Figure 12:
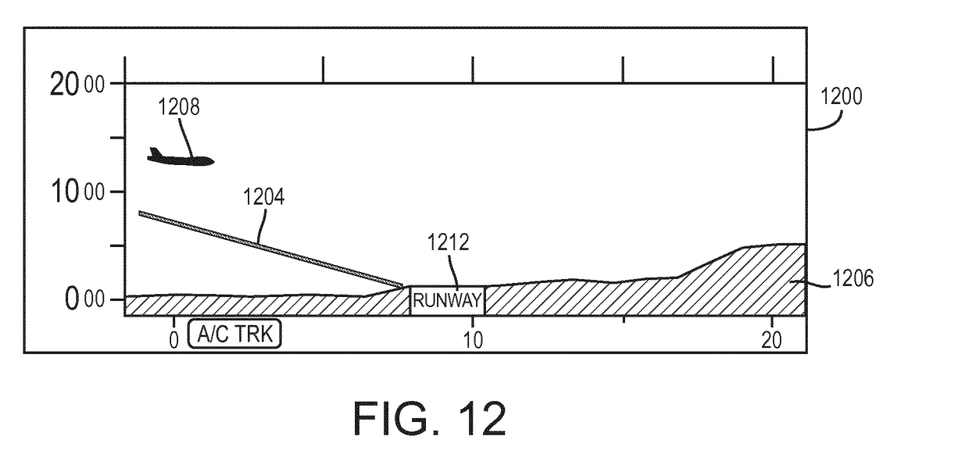
FIG. 12 is a plan view illustration of a VSD display screen showing another precaution alert based upon fixed approach angle for the TAWS illustrated in FIG. 1 according to exemplary aspects of the inventive concepts disclosed herein.

With reference to FIG. 12, a VSD display screen 1200 provides a side view of the flight path with respect to terrain 1206. A yellow line 1204 between the terrain 1206 and a representation 1208 of the aircraft 100 represents a fixed approach angle alert. Unlike line 1104 (FIG. 11), the yellow line 1204 is a diagonal line following the fixed approach angle as the aircraft 100 moves closer to a runway 1212. The line 1204 represents a threshold altitude at which a TAWS caution alert will be provided for a mode 5 alert.

Figure 13:
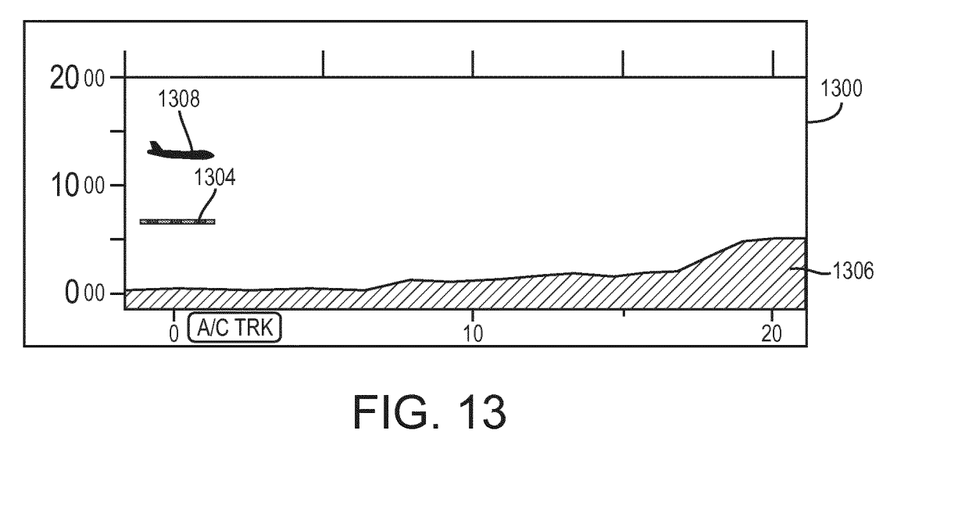
FIG. 13 is a plan view illustration of a display screen showing an FLTA precaution alert based upon distance to runway and vertical speed for the TAWS illustrated in FIG. 1 according to exemplary aspects of the inventive concepts disclosed herein.

With respect to FIG. 13, a VSD display screen 1300 provides a side view of the flight path with respect to terrain 1306. A dashed yellow and red line 1304 between the terrain 1306 and a representation 1308 is a precaution alert for an FLTA. The dashed yellow and red line 1304 represents a precaution alert for a distance to runway and vertical speed. The altitude level represented by dashed yellow and red line 1304 is for the threshold altitude for both the caution alert and the warning alert.

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system. No claim element herein is to be construed under the provisions of 35 U.S.C. § 112, sixth paragraph, unless the element is expressly recited using the phrase "means for." Further, no element, component or method step in the present disclosure is intended to be dedicated to the public, regardless of whether the element, component or method step is explicitly recited in the claims.

As noted above, embodiments within the scope of the present disclosure include program products comprising machine-readable storage media for carrying or having machine-executable instructions or data structures stored thereon. Such machine-readable storage media can be any available media that can be accessed by a general purpose or special purpose computer or other machine with a processor. By way of example, such machine-readable storage media can include RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable storage media. Machine-executable instructions include, for example, instructions and data which cause a general purpose computer, special purpose computer, or special purpose processing machine to perform a certain function or group of functions. Machine or computer-readable storage media, as referenced herein, do not include transitory media (i.e., signals in space).

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include a computing device in the form of a computer, including a processing unit, a system memory, and a system bus that couples various system components including the system memory to the processing unit. The system memory may include read only memory (ROM) and random access memory (RAM) or other non-transitory storage medium. The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules, and other data for the computer.

It should be noted that although specific exemplary orders of method steps are discussed, it is understood that the order of these steps may differ from what is depicted. Also two or more steps may be performed concurrently or with partial concurrence. Such variation will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A method of providing a precaution for an aircraft equipped with a terrain avoidance warning system (TAWS), the precaution being provided before a caution and a warning are issued by the TAWS for a subsequent condition to a precaution condition, the method comprising:
receiving an altitude signal associated with an altitude of the aircraft;
determining an existence of the precaution condition at least partially in response to the altitude signal; and
providing an indicator on a vertical situational display indicative of a threshold altitude in response to the precaution condition, the threshold altitude being an altitude at which the caution is issued by the TAWS, the indicator being the altitude at which the caution is issued in textual form.

2. The method of claim 1, wherein the precaution condition is for an altitude loss
after takeoff condition associated with a ground proximity warning system (GPWS) mode.

3. The method of claim 1, wherein the precaution condition is for a forward looking terrain avoidance alert (FLTA).

4. The method of claim 1, wherein the precaution condition is for a premature descent into terrain (PDA) alert.

5. The method of claim 1, wherein a textual indication of the threshold altitude is provided near the indicator, the indicator comprising a colored line.

6. The method of claim 1, wherein the precaution condition is for a mode 1 alert, a mode excessive descent rate alert terrain (PDA) alert, a mode 2 excessive terrain closure rate, a mode 3 altitude loss after takeoff or go-around alert, for a mode 4 unsafe terrain clearance when not in landing configuration alert, a mode 5 excessive deviation from ILS glide slope alert, or a mode 6 descent below the selected minimum radio altitude alert.

7. The method of claim 6, wherein the precaution condition is for the mode 4 unsafe terrain clearance when not in landing configuration alert and multiple lines are provided at fixed values above the terrain at positions in front of the aircraft.

8. The method of claim 7, wherein the multiple lines are provided directly below a representation of the aircraft and the terrain.

9. The method of claim 1, wherein the precaution condition is for a mode 1 alert, a mode excessive descent rate alert terrain (PDA) alert, a mode 2 excessive terrain closure rate, or a mode 3 altitude loss after takeoff or go-around alert.

10. The method of claim 1, further comprising:
comparing the altitude of the aircraft with elevation of terrain in a terrain database to determine the existence of the precaution condition.

11. The method of claim 1 wherein the indicator comprises a first line and further comprising:
providing a second line on the vertical situational display indicative of a second threshold altitude in response to the precaution condition, the second line being between a representation of the aircraft and a representation of terrain, the second threshold altitude being an altitude at which the warning is issued by the TAWS.

12. A method of providing a precaution for an aircraft equipped with a terrain avoidance warning system (TAWS), the precaution being provided before a caution and a warning are issued by the TAWS for a subsequent condition to a precaution condition, the method comprising:
receiving an altitude signal associated with an altitude of the aircraft;
determining an existence of the precaution condition at least partially in response to the altitude signal; and
providing a colored bar on an altitude tape of a primary flight display in response to the precaution condition, the colored bar being at location of a threshold altitude on the altitude tape, the threshold altitude being an altitude at which the caution is issued by the TAWS.

13. The method of claim 12 further comprising:
providing a textual number of the threshold altitude on the altitude tape.

14. The method of claim 12 wherein the precaution condition is for a forward looking terrain avoidance alert (FLTA).

15. The method of claim 12, wherein the precaution condition is for a mode 1 alert, a mode excessive descent rate alert terrain (PDA) alert, a mode 2 excessive terrain closure rate, a mode 3 altitude loss after takeoff or go-around alert, for a mode 4 unsafe terrain clearance when not in landing configuration alert, a mode 5 excessive deviation from ILS glide slope alert, or a mode 6 descent below the selected minimum radio altitude alert.

16. The method of claim 12 further comprising:
providing a representation of terrain on the primary flight display, wherein the terrain is colored according to a threat associate with the terrain.

17. A method of providing a precaution in an aircraft equipped with a terrain avoidance warning system (TAWS), the precaution being provided before a caution and a warning are issued by the TAWS for a subsequent condition to a precaution condition, the method comprising:
receiving an altitude signal associated with an altitude of the aircraft;
determining an existence of the precaution condition at least partially in response to the altitude signal; and
providing a first line on a topographical display indicative of a threshold altitude in response to the precaution condition, the first line being between a representation of the aircraft and a representation of terrain in a perspective view, the threshold altitude being an altitude at which the caution is issued by the TAWS.

18. The method of claim 17, further comprising:
providing a second line on the topographical display indicative of a second threshold altitude in response to the precaution condition, the second line being between the representation of the aircraft and the representation of terrain in the perspective view, the second threshold altitude being an altitude at which an alert is issued by the TAWS.

19. The method of claim 18, wherein the first line and the second line are in parallel.

20. The method of claim 17, wherein the precaution condition is for a forward looking terrain avoidance alert (FLTA) and the topographical display is part of a head up display or synthetic vision display.

* * * * *